US008655995B2

(12) United States Patent
Elston, III et al.

(10) Patent No.: US 8,655,995 B2
(45) Date of Patent: Feb. 18, 2014

(54) HOME NETWORK COMMISSIONING

(75) Inventors: Wallace J. Elston, III, Paw Paw, MI (US); Anthony E. Jenkins, Covert, MI (US); Gregory S. Lieto, Grand Haven, MI (US); Richard A. Mccoy, Stevensville, MI (US); Michael A. Morrell, Hudsonville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 581 days.

(21) Appl. No.: 12/352,637

(22) Filed: Jan. 13, 2009

(65) Prior Publication Data

US 2010/0180019 A1 Jul. 15, 2010

(51) Int. Cl.
*G06F 15/177* (2006.01)
(52) U.S. Cl.
USPC ........... 709/222; 709/209; 709/220; 370/254; 370/310
(58) Field of Classification Search
USPC ....................................................... 709/222
See application file for complete search history.

(56) References Cited

U.S. PATENT DOCUMENTS

| | | | |
|---|---|---|---|
| 5,922,050 A | 7/1999 | Madany | |
| 6,744,740 B2 | 6/2004 | Chen | |
| 7,203,729 B2 * | 4/2007 | Chen et al. | 709/209 |
| 7,251,222 B2 * | 7/2007 | Chen et al. | 370/256 |
| 2002/0044042 A1 | 4/2002 | Christensen et al. | |
| 2002/0165950 A1 | 11/2002 | Lee et al. | |
| 2002/0169914 A1 | 11/2002 | Shteyn | |
| 2003/0037166 A1 | 2/2003 | Ueno et al. | |
| 2003/0079000 A1 | 4/2003 | Chamberlain | |
| 2003/0120972 A1 | 6/2003 | Matsushima et al. | |
| 2004/0073620 A1 | 4/2004 | Roh et al. | |
| 2004/0111496 A1 | 6/2004 | Han et al. | |
| 2004/0148411 A1 | 7/2004 | Blawat et al. | |
| 2004/0158333 A1 | 8/2004 | Ha et al. | |
| 2004/0240451 A1 | 12/2004 | Lee et al. | |

(Continued)

FOREIGN PATENT DOCUMENTS

GB     2423397 A     8/2006

OTHER PUBLICATIONS

HAI, "HAI UPB Appliance Module Installation and Operating Instruction", Mar. 12, 2008, HAI, all pages.*

(Continued)

*Primary Examiner* — Hua Fan

(57) ABSTRACT

Devices, systems and methods for commissioning a home network and inhibiting unaffiliated wireless communication devices that are physically proximate to each other from forming a wireless network. A wireless communication device may include a transceiver capable of communicating with at least a second device, a non-volatile memory capable of storing a network name, a controller, and a user input acceptance element capable of placing the controller in a network set-up mode. The controller may have a plurality of modes including the network set-up mode, as well as a status indicator for providing an indication of whether the device is operating with one of a parent status and a child status. A method for joining a wireless network may include entering a network set up mode, and scanning for a second device operating with a parent status. If the second device is operating with the parent status, the network name of the second device may be adopted as the network name. However, if there is no second device operating with the parent status, the network name may be established as either a new name or an existing name.

13 Claims, 6 Drawing Sheets

(56) References Cited

U.S. PATENT DOCUMENTS

| | | |
|---|---|---|
| 2005/0002408 A1 | 1/2005 | Lee |
| 2005/0015458 A1 | 1/2005 | La |
| 2005/0043858 A1 | 2/2005 | Gelman et al. |
| 2005/0232301 A1 | 10/2005 | Lee et al. |
| 2006/0270350 A1 | 11/2006 | Kim |

OTHER PUBLICATIONS

Shvaprakash et al, "Efficient Passive Clustering and Gateway Selection in MANETs", 2005, Springer-Verlag Berlin Heidelberg, all pages.*

Hai, "HAI UB Appliance Module Installation and Operating Instructions" document property, Mar. 12, 2008, all pages.*

Easy Pairing Technique Makes Zigbee Appliances Consumer Friendly Found at http://www.embedded-computing.com/news/db/?1043.

Cambridge Consultants Demonstrates Easy Pairing for Zigbee Appliances Found at http://www.embeddedstar.com/press/content/2005/9/embedded18920.html.

Jurdak, Raja, Wireless Ad Hoc and Sensor Networks, A Cross-Layer Design Perspective; Springer Science +Business Media, LLC, 2007; pp. 34-34, 55-57; ISBN 978-0-387-39022-2; New York, New York, USA.

IEEE Standard for Information technology—Telecommunications and information exchange between systems—Local and metropolitan area networks—Specific requirements; Part 11: Wireless LAN Medium Access Control (MAC) and Physical Layer (PHY) Specifications; IEEE Computer Society, Jun. 12, 2007; IEEE Std 802.11-2007; New York, New York, USA.

* cited by examiner

HOME NETWORK COMMISSIONING

BACKGROUND

The present invention relates to devices, systems and methods for commissioning a home network. More particularly, this disclosure describes a device and a method to inhibit unaffiliated wireless communication devices that are physically proximate to each other from forming a wireless network.

Traditionally, setting up a communication network required significant training and expertise. For example, a skilled network administrator may be required to configure each device as well as any controlling devices on the network. However, recent advances in automatic configuration have reduced the experience required. For example, some networking protocols may be able to recognize the existence of other communication devices as potential communication partners. The devices may then negotiate among themselves to form an ad hoc network.

Such an approach may be ideally suited for a wired network where logical and physical barriers such as subnets, switches, routers, firewalls, etc. limit the ability of a particular device to communicate with other devices. However, the increasing popularity of wireless communication devices has introduced new problems with ad hoc or automatic network configuration. For example, there may be cases in which physically proximate devices, such as devices in adjacent dwellings, which are capable of communicating with each other should be inhibited from forming a network. Accordingly, unaffiliated wireless communication devices need a facility to inhibit forming networks with other physically proximate devices.

SUMMARY

Devices, systems and methods for commissioning a home network are described, including devices and a method to inhibit unaffiliated wireless communication devices that are physically proximate to each other from forming a wireless network.

In an exemplary structure, a wireless communication device may include a transceiver capable of communicating with at least a second device, a non-volatile memory capable of storing a network name, a controller, and a user input acceptance element capable of placing the controller in a network set-up mode. The controller has a plurality of modes including the network set-up mode, as well as a status indicator for providing an indication of whether the device is operating with one of a parent status and a child status.

In an exemplary method, a wireless communication device may join a wireless network by entering a network set up mode and scanning for a second device operating with a parent status. If the second device is operating with the parent status, the network name of the second device may be adopted as the network name. However, if there is no second device operating with the parent status, the network name may be established as either a new name or an existing name.

In another exemplary method, a wireless communication device may join a wireless network by receiving an indication to join the wireless network; receiving an indication to assume a parent status; entering a network set-up mode; and establishing one of a new name and an existing name as the network name based on whether the device is already associated with the wireless network.

The present disclosure will be more fully understood upon reading the following detailed description in conjunction with the accompanying drawings.

DETAILED DESCRIPTION

Figure 1:
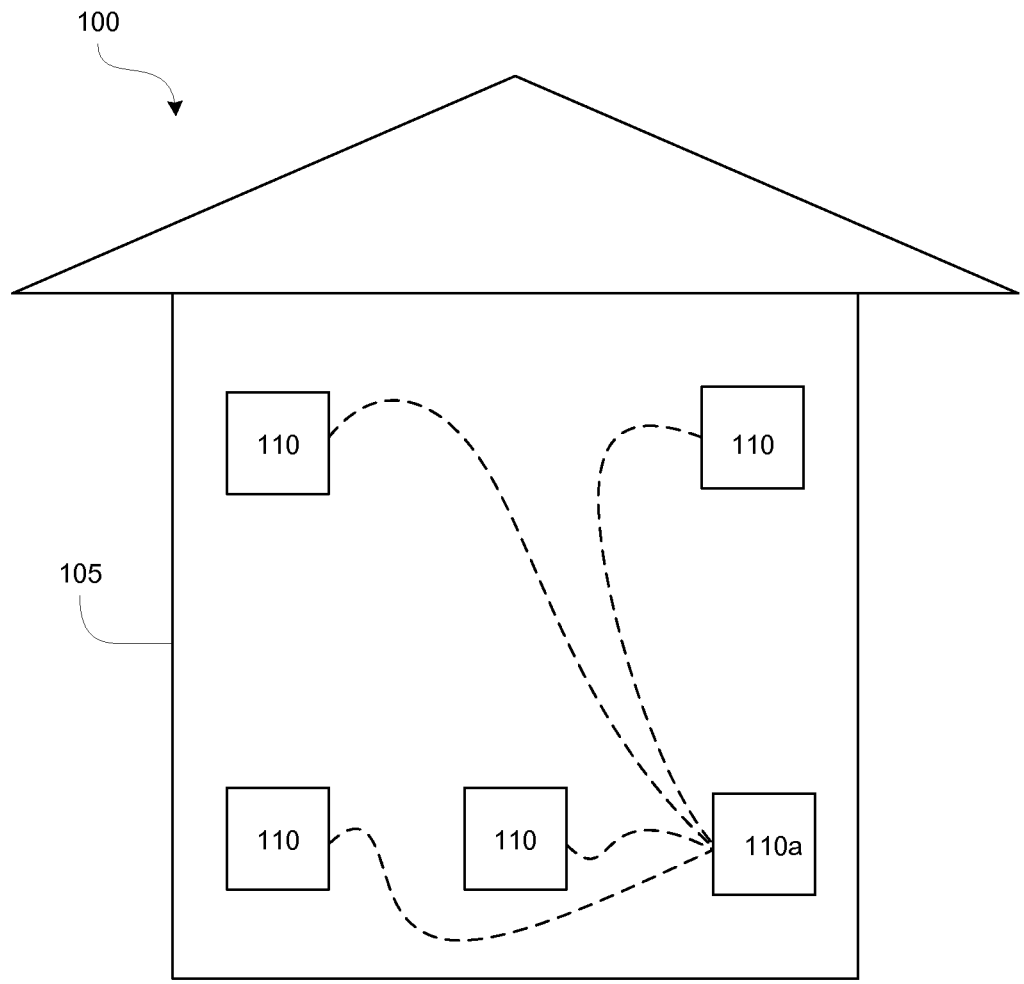
FIG. 1 is a system diagram of a plurality wireless communication devices and home networks.
Figure 1:
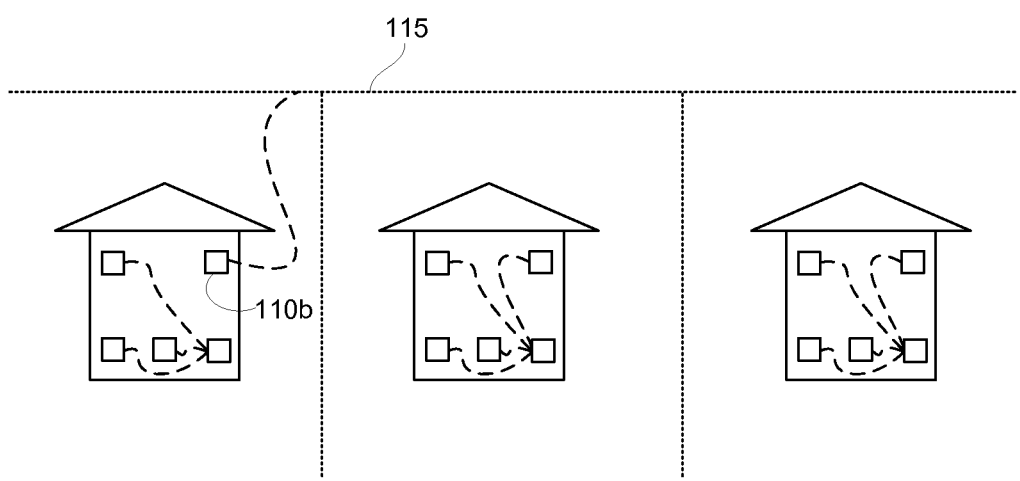

The descriptions set forth herein are not intended to be exhaustive or otherwise limit or restrict any claims based thereon to the precise forms and configurations shown in the drawings and disclosed in the following detailed description.

Various novel components, systems, and methods will be described for commissioning a wireless network.

Referring now to the drawings, preferred embodiments are shown in detail. Although the drawings represent contemplated embodiments, the drawings are not necessarily to scale and certain features may be exaggerated to better illustrate and explain the present embodiments. The embodiments set forth herein are not intended to be exhaustive or otherwise limit the invention to the precise forms disclosed in the following detailed description. For example, while the present invention is particularly beneficial when used in connection with networked appliances, the methods and systems described are applicable to more general use in connection with wireless environments and wireless devices.

Referring to FIG. 1, a plurality of wireless networks 100 may operate in proximity to each other. For example, a residential home 105 could have numerous wireless communication devices 110 operating together to form a wireless network. The communication devices 110 typically communicate according to a communication protocol. The communication protocol may also provide an addressing scheme and steps for automatically forming a wireless network among multiple communication devices 110. Forming a wireless network generally includes establishing unique addresses for each device and developing a table, or the like, containing the addresses and routes to the other devices.

In one exemplary approach, the communication protocol governing the wireless network may designate the devices as peers with equal ability to communicate with the other devices. In another exemplary approach, the protocol may designate a controlling device to manage the communications between all of the devices of the network. However, in a hybrid approach, the communication devices 110 typically operate as peers except during the formation of the wireless network. For example, during the formation of the wireless network, a particular communication device 110a may assume a parent status, while the remaining devices assume a child status. Such an approach may be useful in inhibiting proximate, but unaffiliated devices, from joining the wireless network.

Other nearby homes may also include wireless networks with numerous communicating devices. During the formation of a wireless network, a proximate communication device 110*b* may attempt to join a network of unaffiliated devices, such as the network of a neighboring home. The communication protocol should provide a virtual barrier 115 to inhibit unaffiliated devices from forming a wireless network.

The communication protocol may use an identifier, such as a network name, to distinguish between different wireless networks. For example, each wireless network in range of another wireless network may be required to develop a unique network name. The network name may be used as an attribute or extension to the network address of each communication device 110. Accordingly, communication protocol may inhibit devices from communicating with other devices having a different network name.

In order to use a network name as the virtual barrier 115, all affiliated devices may need to be configured with the same name. In one exemplary approach, the device may include a rich user interface allowing for the assignment of a network name. However, it may not be practical to include such an interface with many types of network devices. Accordingly, an automatic configuration process may be useful for devices lacking a rich user interface.

When using an automatic configuration process, some degree of outside coordination may be required to inhibit unaffiliated devices from forming a network. For example, the coordination may be based on a timing schedule, direct control from a managing device (not shown), or direct control from a human operator. As will be described in more detailed below, the communication devices 110 may include a user interface to allow a human operator to coordinate the network commissioning. Control interface 230 may allow the device to be placed in a set-up mode for a period of time. All proximate devices placed in the set-up mode at a corresponding time may then join the same network. Moreover, there may be a predetermined time limit for a device to be in the set-up mode. In one exemplary approach, the communication device 110 may remain in the set-up mode for five minutes. In general, the time limit should provide sufficient time for the operator to place all of the affiliated devices into the set-up mode. Thus, by providing an interface for placing the device into the time-limited set-up mode, unaffiliated devices may be inhibited from joining the wireless network.

Figure 2:
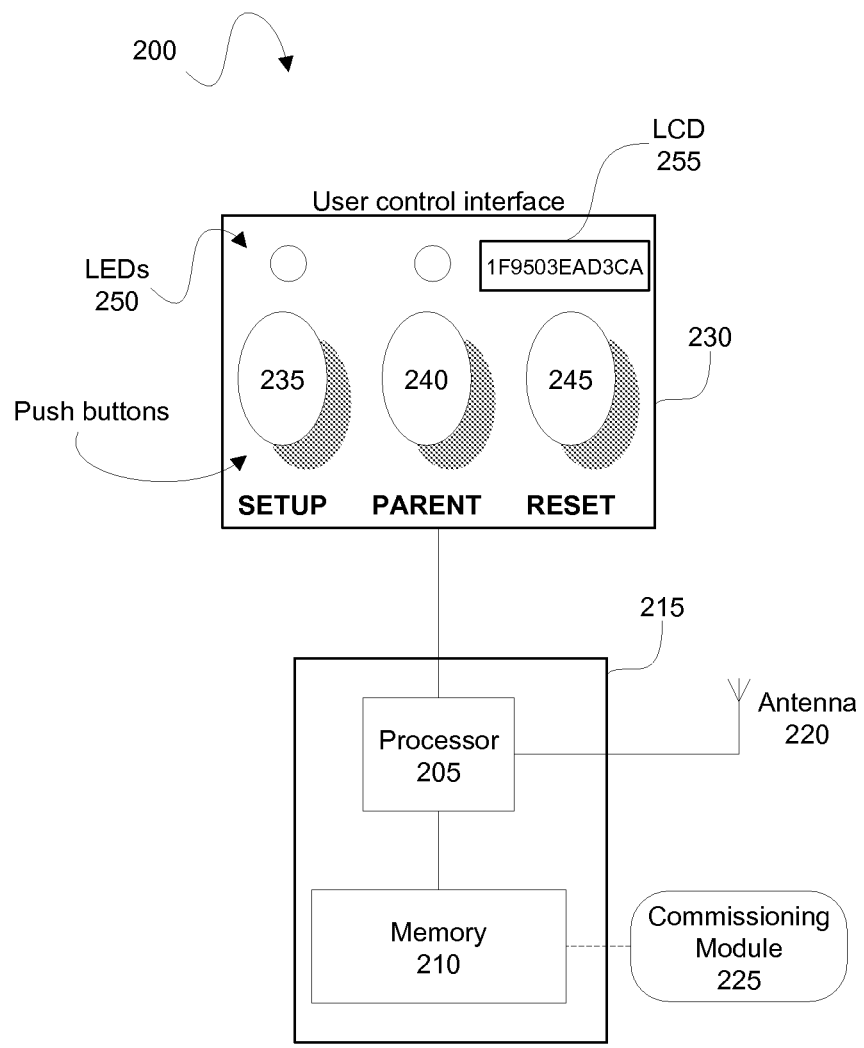
FIG. 2 is system diagram of a user interface and controller for a wireless communication device.

Referring to FIG. 2, a controller 200 included with each communication device 110 may be used to join a wireless network. The controller 200 may include a processor 205 and memory 210 attached together via a printed circuit board 215, or the like. The processor 205 may interface with an antenna 220 for communicating with other communication devices 110. Accordingly, the processor 205 and antenna 220 may implement radio frequency based communication receiving and transmitting functions to provide a transceiver. A commissioning module 225 may include software instructions stored in the memory 210 for controlling the processor 205. For example, the commissioning module 225 may implement the communication protocol including instruction for joining a wireless network.

The processor 205 and antenna 220 may implement various radio frequency communication technologies. For example, communication technologies such as ZWAVE®, ZIGBEE®, wireless USB®, Bluetooth®, WI-FI, etc. may be implemented. Each implemented radio technology generally defines a communications protocol as well as the frequency and power settings associated therewith. In generally, the communication devices 110 need to implement the same radio technology in order to be able to communicate with each other.

The processor 205 may be any generalized processing component capable of interfacing with the memory 210, antenna 220, and user interface 230 (discussed below). Accordingly, processor 205 may provide a general purpose or embedded computer system with physical interface ports for the other elements. The memory 210 may store computer instructions, such as the instructions of the commissioning module 225. The memory 210 may be capable of receiving instructions from another source one time or multiple times. For example, the memory 210 may be erasable or flashable in order to receive new instructions. Additionally, the memory 210 may be used to store the network name of the wireless network to which the communication device 110 is affiliated. However, in another exemplary approach, the memory 210 may be distinct from the memory that stores the network name.

The antenna 220 may be an external antenna connected to an interface of the processor 205. However, in another exemplary approach, the antenna 220 may be integrated with the printed circuit board 215. The antenna 220 may be paired with the particular technology implemented by the processor 205. For example, a radio technology that operates in the 900 MHz frequency range and a radio technology that operates in the 2.4 GHz frequency range would need antennas 220 capable of respectively receiving and transmitting radio communications in the 900 MHz and 2.4 GHz ranges.

A user control interface 230 presents controls and feedback to a human operator of the communication device 110. The interface 230 may provide a plurality of pushbuttons 235, 240, 245 (discussed below), or the like, for receiving user input. Light emitting diodes (LEDs) 250 and a liquid crystal display (LCD) 255 may provide user feedback. For example, the LEDs may indicate whether the device is in the network set-up mode, and whether the device is operating with the parent status. The LCD display 255 can report the network name to which the device is affiliated. In another exemplary approach, the user control interface 230 may include a touch sensitive LCD screen, or the like, for displaying a graphical user interface. Moreover, the pushbuttons 235, 240, and 245 may be graphical elements configured to be activated when the defined region of the screen associated therewith is contacted by the operator.

The SETUP pushbutton 235 may allow a human operator to place the device into the network set-up mode. For example, pressing the pushbutton 235 may provide an indication that the device should attempt to join or form a wireless network. The process for joining a wireless network is described in detail below with respect to FIGS. 4A and 4B. As discussed above, the communication protocol may provide for a particular communication device 110*a* to act as a parent device. In one exemplary approach, the communication devices 110 will automatically determine which device should act as the parent communication device 110*a*. However, in another exemplary approach, the human operator may specifically designate the parent device by pressing the PARENT pushbutton 240. For example, pressing the PARENT pushbutton 240 may cause the device to assume the parent status and operate therewith throughout the duration of the network set-up mode. A RESET pushbutton 245 may be provided to erase the network name of a communication device 110. For example, if the communication device 110 should inadvertently join an unaffiliated wireless network, the RESET pushbutton 245 may be used to remove the device from the network. In another example, the operator may wish to segment the network into two distinct networks. Moreover, the RESET pushbutton 245 may be used anytime the affiliation of the device with the wireless network should be broken.

The controller 200 represents general computer processing capabilities that may be provided by a general-purpose computer, server, or personal compute (PC), as well as by a specialized embedded system. Moreover, the controller 200 may be any computer system capable of operating the instructions provided by the commissioning module 225. The controller 200 may have software, such as an operating system with low-level driver software, and the like, for communicating with peripheral devices and communication interfaces such as the memory 210, antenna 220, and user control interface 230.

The controller 200 may employ any of a number of user-level or embedded operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

The controller 200 may each include instructions executable by one or more processing elements such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 3:
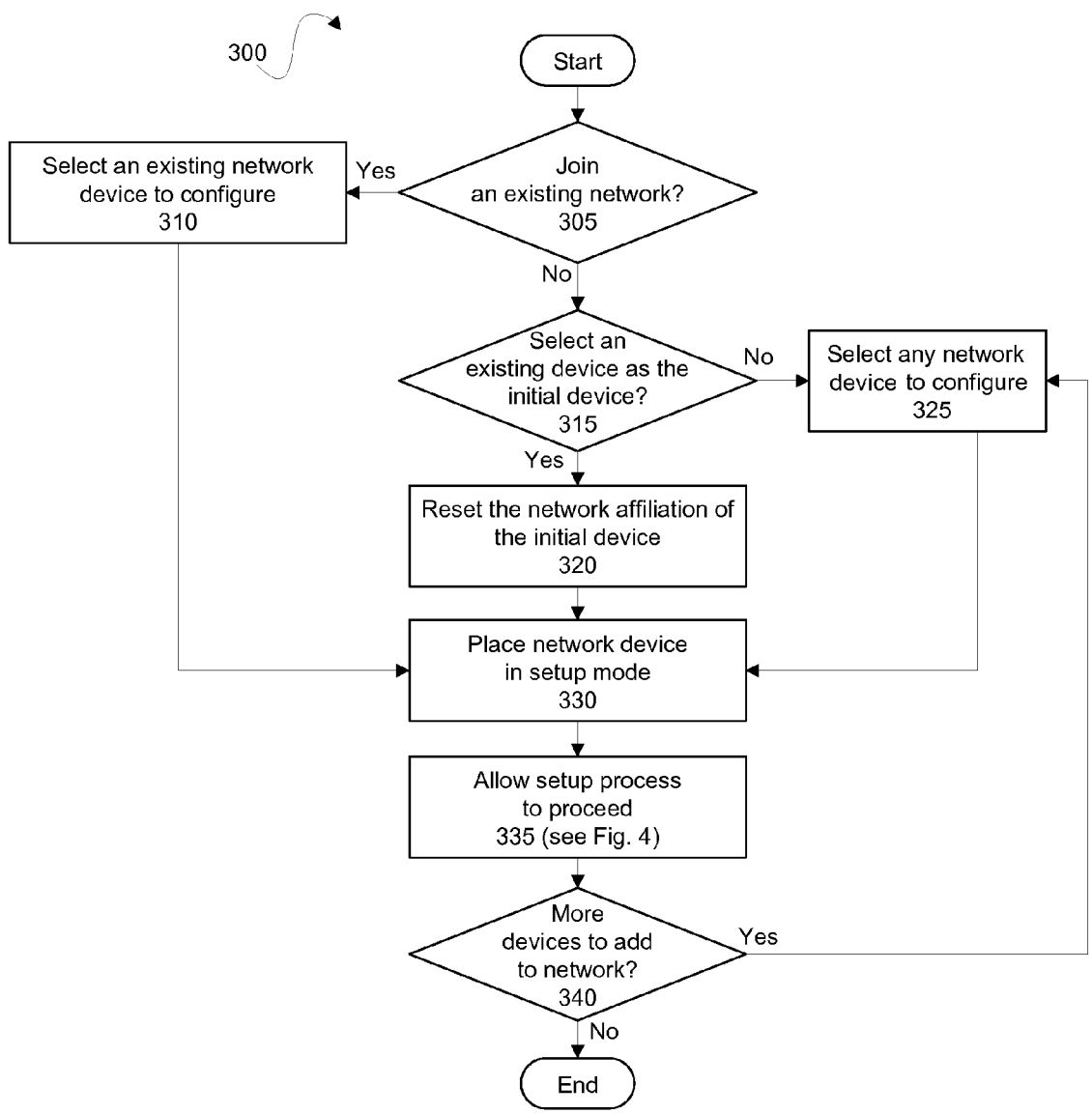
FIG. 3 is a flowchart depicting exemplary steps and decisions related to commissioning a home network for a plurality of wireless communication devices.

FIG. 3 illustrates a process 300 for commissioning a home network for a plurality of wireless networking communication devices 110. The controller 200 may include a computer-readable medium having stored instructions for carrying out certain operations described herein, including some or all of the operations described with respect to process 300. For example, some or all of such instructions may be included in the commissioning module 225. Some steps of process 300 may include user input and interactions. However, it is to be understood that fully automated or other types of programmatic techniques may implement steps that include user input.

Commissioning a wireless network using the above-described communication devices 110 can involve many possible scenarios. For example, a network may be commissioned from scratch with all new devices that have yet to be affiliated with any other network. In another exemplary approach, a new and unaffiliated device may be added to an existing network. Alternatively, the new and unaffiliated device may create a separate network from an existing network. Still further, one or more existing devices along with any number of new devices may form a separate network from a previously commissioned existing network. Accordingly, it must be decided whether to create a new network or to use an existing network. Correspondingly, it must be decided whether to use an existing device or a new device as the initially configured device. As will be described in more detail below with respect to processes 400 and 475, the initially configured device will assume the parent status.

With these possibilities in mind, process 300 begins in step 305 by determining whether an existing network should be joined. Joining an existing network may eliminate the need to reconfigure the existing network devices. For example, if a network includes ten existing devices, it would be tedious to reconfigure each device simply to add one new device. Accordingly, process 300 allows for the addition of a new device to an existing network such that only one existing device needs to participate in the network commissioning process. In one exemplary approach, the determinations of steps 305 may be made by a human operator. However, in other exemplary approaches with an enhanced user control interface 230, the controller 205 may scan for existing networks and prompt the operator to either select an existing network or choose to create a new network. If the device should join an existing network, the process will continue to step 310. However, if a new network will be established, the process will skip to step 315.

In step 310, an existing device that is already affiliated with a previously commissioned wireless network will be selected as the initial device. The operator may use the SETUP pushbutton 235 of the user control interface 230 to place an existing device in the network set-up mode. As will be described in detail below, when the device is already affiliated with a network, it will maintain its affiliation even if placed in the network set-up mode so long as there are no other nearby devices that are operating with the parent status.

In step 315, it may be determined whether the device selected as an initial device is already affiliated with an existing network. Step 315 will only be reached if it is determined in step 305 that the device being configured should not join an existing network. Accordingly, a new network will be commissioned. When commissioning a new network, either an unaffiliated device or a device already affiliated with an existing network may be used as the initial device. If the initial device is affiliated with an existing network, the process may proceed to step 320 to break the affiliation. However, if the initial device is not affiliated with an existing network, step 320 may be skipped and the process may proceed to step 325.

In step 320, the network affiliate of the initial device may be broken or reset. The operator may use the RESET pushbutton 245 of the user control interface 230 to break the affiliation. As explained above, the RESET pushbutton 245 will erase the portion of the memory 210 that holds the network name of the network to which the device is affiliated. However, it should be appreciated that step 320 is only necessary if a currently affiliated device is used as the initial device for commissioning a new network. If new device that has never been affiliated with a network is used as the initial device, step 320 would not be necessary.

In step 325, any device is selected for configuration. In one exemplary approach, a human operator may move between different devices to select a particular device to configure. However, in an automated approach, a list of all available devices may be maintained by a network manager (not shown). In such an approach, selecting the device to configure may be a matter of iterating through the list of devices. However, the list of devices would only include those devices that should be affiliated with the same network.

Following each of steps 310, 320, and 325, the device may be placed into the network set-up mode in step 330. As explained above, the user interface 230 of the controller 200 may include a SETUP pushbutton 235, or the like, configured to receive user input. By pressing the SETUP pushbutton 235, the user may provide an indication that the communication device 110 should enter the network set-up mode. However, in other exemplary approaches that omit the SETUP pushbutton 235, the communication device 110 may enter the network set-up mode according to the timing of a predefined schedule. In yet another exemplary approach, a network-managing device (not shown) may send a signal via the wireless network that the communication device 110 should enter the network set-up mode.

Figure 4A:
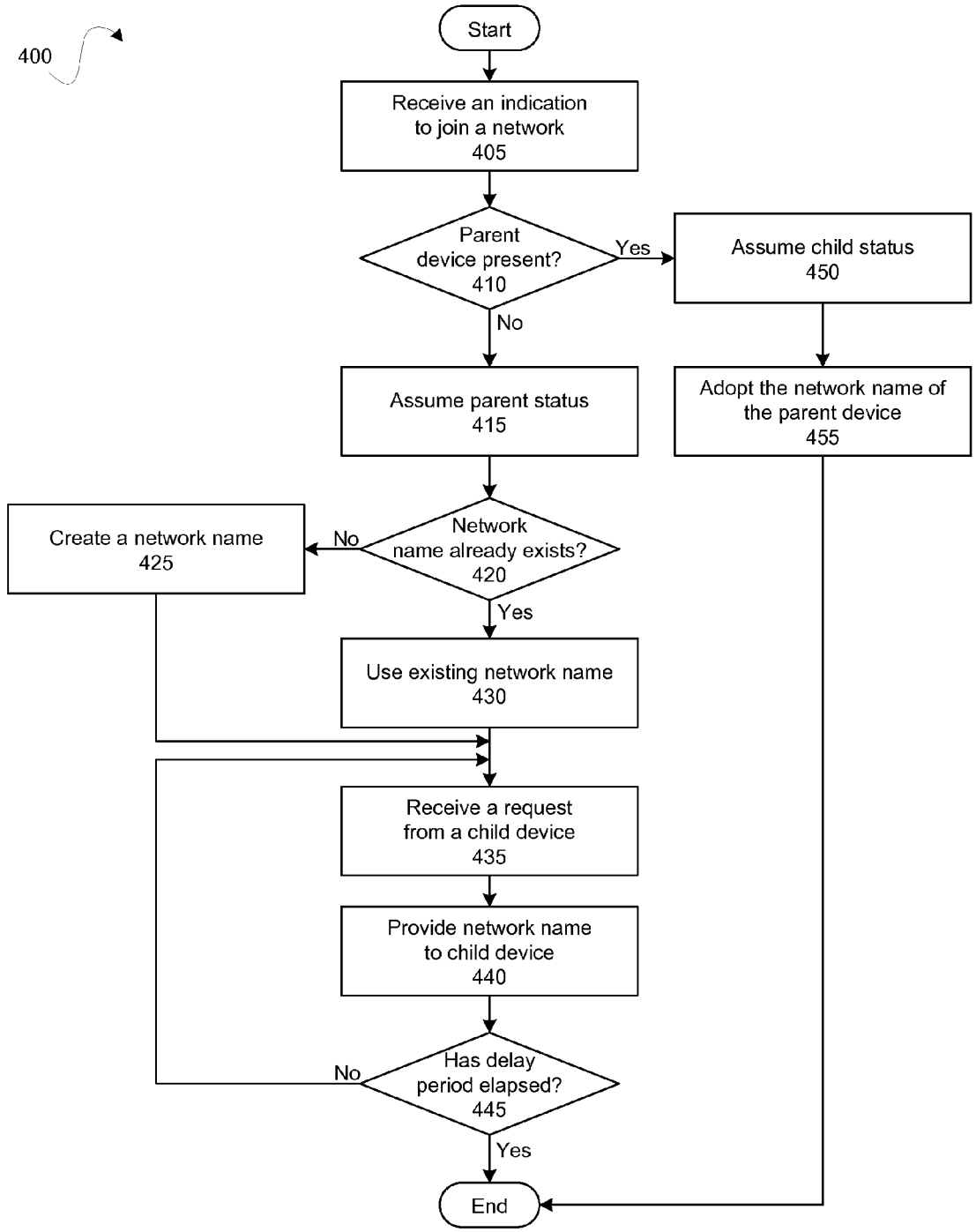
FIG. 4A is a flowchart depicting exemplary steps and decisions of a single wireless device when joining a wireless network.
Figure 4B:
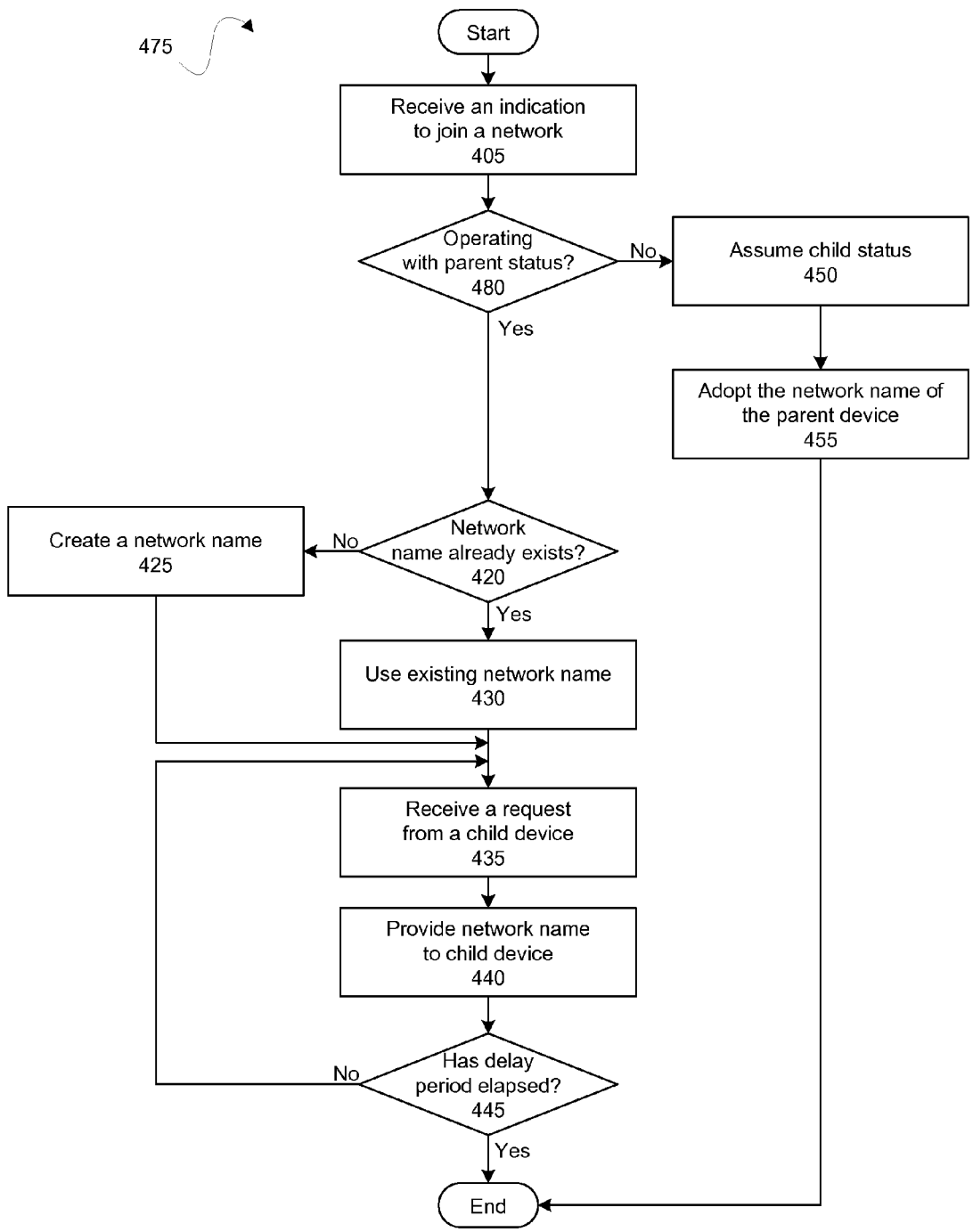
FIG. 4B is a flowchart depicting other exemplary steps and decisions of a single wireless device when joining a wireless network.

Next, in step 335, the selected communication device 110 will initiate the set-up process. FIGS. 4A and 4B illustrate exemplary step-up processes and will be discussed in detail below. The set-up process may simply be initiated and does not need to be concluded prior to transitioning to step 340. In fact, all communication devices 110 that are to join the same network should be placed in the network set-up mode at a corresponding time. Moreover, the set-up process of step 335 may include delay time to provide an operator with the necessary time to enable the set-up mode on all of the devices that are to be joined in a network.

Next, in step 340, it may be determined whether there are more devices to configure. If there are other communication devices 110 that should be joined together in the same network, the process 300 may return to step 325. However, if there are no more communication devices 110 to configure, process 300 ends.

FIG. 4A illustrates a process 400 implemented by a single communication device 110 when joining a wireless network.

The controller 200 may include a computer-readable medium having stored instructions for carrying out certain operations described herein, including some or all of the operations described with respect to process 400. For example, some or all of such instructions may be included in the commissioning module 225. Some steps of process 400 may include user input and interactions. However, it is to be understood that fully automated or other types of programmatic techniques may implement steps that include user input.

Process 400 begins in step 405 when the communication device 110 receives an indication to join a network. As explained above, the indication may be provided by an operator activating a pushbutton 235, or the like, of the user control interface 230.

Next, in step 410, it may be determined whether there is a parent device present. The communication device 110 may scan for proximate devices operating with the parent status. For example, the parent device may be charged with broadcasting the network name of the wireless network. If the device identifies that a network name is being broadcast by another device, it may be determined that a parent device is present. However, in another exemplary approach, the parent communication device 110a may explicitly broadcast an indication of its parent status along with the network name.

If no parent device is identified in step 410, then the parent status may be assumed in step 415. Once assumed, the device will operate with the parent status for the duration of the network set-up mode. It is to be understood that any device may operate with either the parent or the child status. Unless overridden by the use of the PARENT pushbutton 240 (discussed below with respect to FIG. 4B), timing may determine which device operates with the parent status. For example, the first device placed in the setup mode may operate with the parent status.

Next, in step 420, it may be determined whether a network name already exists. If the device has previously been part of wireless network, a network name may already be stored in the memory 210. However, as discussed above, a RESET pushbutton 245 may included to erase the network name stored in the memory 210. Accordingly, if the device has not previously been part of a wireless network, or if the RESET pushbutton 245 has been pressed, the network name will not exist.

If the network name does not exist, a new name will be created for the network name in step 425. In one exemplary approach, the network name may be a randomly generated alphanumeric string. However, in another exemplary approach, the network name may default to a manufacture serial number, or the like.

If the network name does exist, the existing name will be read from the memory 210 and be used as the network name in step 430. By using an existing name, a new device can be added to the wireless network with only the assistance of one other device that is already part of the wireless network. Moreover, the network setup mode will not need to be enabled on every device of the wireless network each time a new device is added.

Next, in step 435, the device may receive a request from a child device. When operating with the parent status, the parent communication device 110a must be available to receive requests for the network name from the child devices. Because only one device will be operating with the parent status, all devices in the network set-up mode at a corresponding time should adopt the network name of the parent device. Accordingly, devices in the network set-up mode at corresponding times will join the same wireless network, while unaffiliated devices will be inhibited from joining.

Next, in step 440, the parent communication device 110a may respond to the request by providing the name of the wireless network.

Next, in step 445, it will be determined whether the delay period has elapsed. As discussed above, the parent communication device 110a is configured to remain in the network set-up mode for a predetermined period of time. The processor 205 may implement a timer set to the predetermined period of time. The period of time provides a sufficient amount of time for the operator to reach each of the devices that should be joined in the same wireless network. Moreover, there will only be a limited amount of time for all of the affiliated devices to join the wireless network. The network setup mode will expire or elapse at the end of the time period. A network setup mode with a limited time period may inhibit proximate, but unaffiliated, devices from joining the wireless network. For example, an unaffiliated device would need to serendipitously enter the network set-up mode at a corresponding time to join the network. If the delay period has not elapsed, process 400 returns to step 435 to receive additional requests from child devices. However, if the delay period has elapsed, process 400 ends. At the end of the timeout period the LCD display 255 of the communication device 110 may provide the user with a list all the devices in the network. This will provide the confirmation to the user that all devices are in the network but also confirm that no undesired devices are linked. If undesired devices are linked, then logic in controller 200 may be used to remove any such device from the network.

Returning to the determination in step 410, the device may assume the child status in step 450 if a parent device is identified. For example, the device may receive a response from a parent communication device 110a indicating that it is operating with the parent device status. As another example, the device may identify that a network name of a parent communication device 110a is being broadcast by another communication device 110, and may determine that a parent communication device 110a is present.

Next, in step 455, the network name of the parent communication device 110a will be adopted as the network name. For example, the response from the parent communication device 110a may include the network name. The name will be extracted from the response and stored in the memory 210 as the network name. After receiving and adopting the network name, process 400 may end.

FIG. 4B illustrates a process 475 implemented by a single communication device 110 when joining a wireless network. The controller 200 may include a computer-readable medium having stored instructions for carrying out certain operations described herein, including some or all of the operations described with respect to process 475. For example, some or all of such instructions may be included in the commissioning module 225. Some steps of process 475 may include user input and interactions. However, it is to be understood that fully automated or other types of programmatic techniques may implement steps that include user input.

Process 475 includes most of the same steps of process 400, which will not be described again. However, steps 410 and 415 are replaced by step 480. In step 480, it may be determined whether the device is set to operate with the parent status. If the device is set to operate with the parent status, process 475 may proceed to step 420. However, if the device is not set to operate with the parent status, process 475 may proceed to step 450. The description of the remaining steps and decisions of process 475 are presented above with respect to process 400.

Thus, if two devices, both of which are in setup mode, but only one of which has a network name, are placed in setup mode within the predetermined time of each other, then, the device that does not have a network name will adopt the network name provided by the device that already has a network name, the parent device. However, if two devices, both of which are in setup mode, but neither of which has a network name, send queries within the predetermined time, then, after the predetermined period of time has expired for the first device to send a query, the first device will create a network name, assume a parent status, and inform the second device of the network name. The second device will assume the child status and adopt the network name provided by the first device.

For clarity, it should be noted a "parent device", as used in the above description, includes any device which has been placed in set upmode and which has a network name already assigned to it. The network name of that parent device may be a name created by that parent device or may be a name adopted by that parent device from another device at the time when that parent device joined the network. Furthermore, the term "parent device" also includes any first device which assumes the status of a parent device after a predetermined period of time following a query, if the first device has failed to receive a response from a second device in setup mode that that already has a network name.

Accordingly, devices and methods have been discussed for commissioning a wireless network. A plurality of peer devices may share a common network name in order to form a wireless network. To prohibit unaffiliated devices from joining the wireless network, a time-limited network set-up mode may be implemented. An indication may be received by a device to enter the network setup mode. The device will scan for any devices operating with the parent status. If no parent device is identified, the device will assume the parent status and establish the network name for the wireless network. The parent device will then respond for a limited period of time to any child devices requesting the network name. At the end of the time time-limited network setup period, the device will no longer operate with the parent status in order to prohibit unaffiliated devices from joining the network.

It is contemplated that a user may at some point desire to merge two autonomous existing networks. This need may arise because the user has unintentionally created two independent networks by creating a first network, for example, between two appliances in the user's kitchen and subsequently creating a second network between a washer and a dryer. It is contemplated, therefore, that an alternative mechanism be provided for merging two existing networks.

Figure 5:
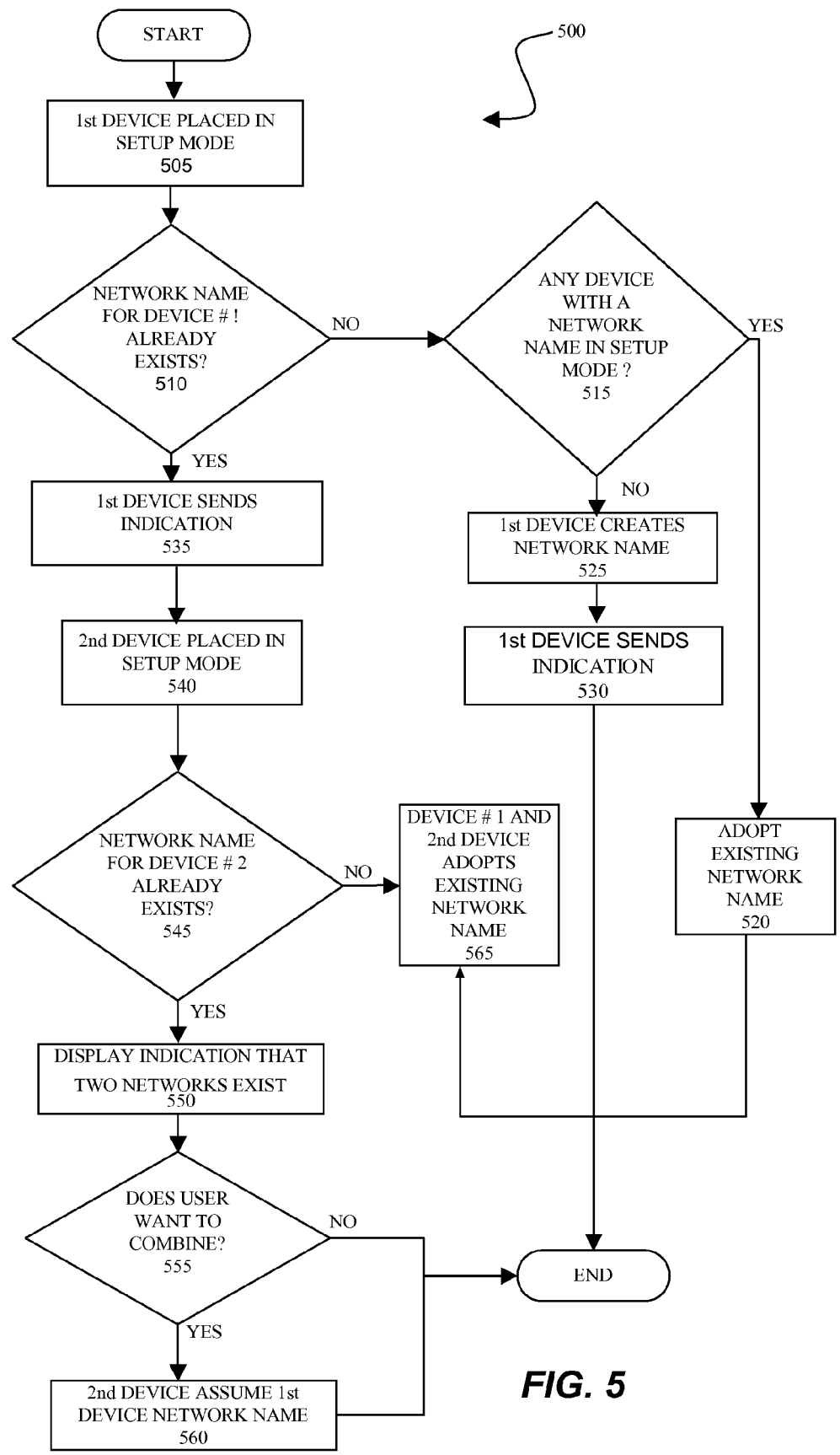
FIG. 5 is a flow chart depicting other exemplary steps and decisions related to commissioning a home network for a plurality of wireless communication devices.

FIG. 5 illustrates an alternative process 500 for commissioning a home network for a plurality of wireless networking communication devices 110 that takes into account the possibility that it may be desirable to merge multiple networks. Process 500 may be combined with the steps of any of the processes described above.

Process 500 begins in step 505 by placing a first device, which either currently has or currently does not have a network name, in a setup mode. The first device sends a query for other devices in setup mode. In step 510, the first device determines if it has a network name.

If in step 510, the first device determines that it does not have a network name, then in step 515 it assumes child status and waits for a predetermined period of time for an indication that there is an existing network to join in the form of receipt of an indication to join a network from another device in parent status. If it finds a device in parent status with the predetermined period of time, then in step 520, it joins the existing network by adopting the existing network name. The process then ends. If, in step 515, the first device does not detect an existing network prior to the expiration of the predetermined period of time, then the first device changes to parent mode and creates a network name in step 525. Next, in step 530, the first device invites other devices to join its new network. As described above with reference to processes 400 and 475, a second device which may be placed in setup mode after the first device was placed in setup mode will not yet have timed out and therefore will detect the first device and adopt its network name.

If, however, in step 510, the first device determines that it does have a network name, then, in step 535, it may send an indication to adopt its network name. In step 540, the first device becomes aware that a second device has been placed in setup mode. In step 545, the first device determines if the second device has adopted a network.

If, in step 545, the first device determines that the second device has adopted a network, then it will be determined that two networks exist and devices on the two networks are both in setup status. In that event, in step 550, the LCD display 255 of communication device 110 will provide an indication to the user that two networks exist. In step 555, the controller 220 awaits a user input indicating whether the user wants to combine the networks. The user input may be provided in various ways, such as by having the user confirm the desire to merge the two networks by re-pressing the setup buttons associated with the first and second devices within a predetermined period of time. The sequence in which the buttons are pressed may be used to determine which network will survive, such as by pressing the button corresponding to the surviving network first or second. If the user chooses in step 555 to combine the networks, then in step 560, controller 220 will send a control signal to one of the devices, such as the second device, to adopt the network of the other of the devices, such as the first device. If the user chooses in step 555 to not combine the networks, then in step 560, or if step 555 times out before the user makes a choice, then the process ends.

Returning to step 545, if, the first device has determined in step 510 that it has a network name and determines in step 545 that the second device does not have a network, then, in step 565, the second device adopts the network name of the first device in the manner described above with reference to processes 400 and 475 and the process ends.

This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application. For example, logic could be provided to require user input or to prevent the creation of any network connection if three or more devices are placed in setup mode within the predetermined period of time, to avoid inadvertent connection a device to the wrong network.

Various modifications from the system and method described above and various permutations and combinations of the features described are contemplated. For example, it is appreciated that the system and method described above may be combined with other security devices and protocols. Still further, it is appreciated that the devices in setup mode described above may be required to communicate directly with each other. For some applications, however, where the desired network to be created may require that due to size or environmental issues, it may be desirable to permit devices placed in setup mode to alternatively communicate with each other through any intermediate device or through authorized intermediate devices.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A wireless communication device comprising:
a transceiver capable of communicating with at least one second device;
a non-volatile memory capable of storing a network name associated with the wireless communication device;
a controller having:
a commissioning module configured to implement a communication protocol including instructions for forming or joining a wireless network with the at least one second device in a network set-up mode; and
a status indicator that indicates to an end user whether the wireless communication device is operating with one of a parent status where it broadcasts the network name to the at least one second device and a child status where it receives the network name from the at least one second device;
a first user input acceptance element configured to place the controller in the network set-up mode;
a second user input acceptance element configured to place the wireless communication device in the parent status; and
a third user input acceptance element configured to erase the network name;
wherein the commissioning module automatically implements the communication protocol to join or form the wireless network when an end user actuates one of the first, second, and third user input acceptance elements, the first user input acceptance element causing the communication protocol to ascertain a parent or child status, the second user input acceptance element causing the communication protocol to establish a parent status, and the third user input acceptance element causing the communication protocol to erase a network name the non-volatile memory.

2. The wireless communication device according to claim 1, further comprising a timer for terminating the network set-up mode after a predetermined period of time.

3. The wireless communication device according to claim 1, further comprising instructions encoded in the non-volatile memory to cause the controller to:
receive an indication to join the wireless network; and enter the network set-up mode.

4. The wireless communication device according to claim 3, further comprising additional instructions encoded in the non-volatile memory to cause the controller to:
scan for a second device operating with a parent status;
adopt a network name of the second device if the second device is operating with the parent status; and
establish one of a new name and an existing name as the network name if there is no second device operating with the parent status.

5. The wireless communication device according to claim 4, further comprising additional instructions encoded in the non-volatile memory to cause the controller to assume the parent status if there is no second device operating with the parent status.

6. The wireless communication device according to claim 4, further comprising additional instructions encoded in the non-volatile memory to cause the controller to assume the child status if the second device is operating with the parent status.

7. The wireless communication device according to claim 3, further comprising additional instructions encoded in the non-volatile memory to cause the controller to:
receive a request to form a wireless network from a second network device; and
respond to the request with the network name.

8. The wireless communication device according to claim 3, further comprising a second user input acceptance element to cause the device to operate with the parent status and additional instructions encoded in the non-volatile memory to cause the controller to:

establish one of a new name and an existing name as the network name based on whether the device is already associated with the wireless network.

9. The wireless communication device according to claim 8, further comprising additional instructions encoded in the non-volatile memory to cause the controller to:
receive a request to form a wireless network from a second network device; and
responding to the request with the network name.

10. The wireless communication device according to claim 2, wherein the timer determines which device operates with a parent status.

11. The wireless communication device according to claim 1 further comprising
a timing schedule configured to place the controller in the network set-up mode for a limited time.

12. The wireless communication device according to claim 1 wherein the first user input acceptance element comprises a setup pushbutton that when pressed places the wireless communication device in the network setup mode.

13. The wireless communication device according to claim 1 wherein the third user input acceptance element comprises a reset button that when pressed will break any affiliation of the wireless communication device with the wireless network.

* * * * *